(12) United States Patent
Katayama et al.

(10) Patent No.: US 9,273,603 B2
(45) Date of Patent: Mar. 1, 2016

(54) VEHICLE-MOUNTED POWER SUPPLY SYSTEM

(71) Applicant: DENSO CORPORATION, Kariya, Aichi-pref. (JP)

(72) Inventors: Naoki Katayama, Kariya (JP); Shunichi Maeda, Anjo (JP); Shigenori Saito, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 14/206,428

(22) Filed: Mar. 12, 2014

(65) Prior Publication Data
US 2014/0261250 A1 Sep. 18, 2014

(30) Foreign Application Priority Data
Mar. 15, 2013 (JP) .................. 2013-052963

(51) Int. Cl.
*H02J 7/00* (2006.01)
*F02B 63/04* (2006.01)
*B60K 6/48* (2007.10)
*B60L 11/02* (2006.01)

(52) U.S. Cl.
CPC .............. *F02B 63/042* (2013.01); *B60K 6/48* (2013.01); *B60L 11/02* (2013.01)

(58) Field of Classification Search
CPC ...... H02J 7/0024; H02J 7/1423; Y02E 60/12; H01M 10/441; Y02T 10/7005; Y02T 90/14; Y02T 10/70; Y02T 10/7011; Y02T 10/7016; Y02T 10/7022
USPC .......................................... 320/117
See application file for complete search history.

(56) References Cited

U.S. PATENT DOCUMENTS

| | | | | | |
|---|---|---|---|---|---|
| 5,563,802 | A | * | 10/1996 | Plahn | H02J 9/062 290/1 R |
| 2003/0073540 | A1 | * | 4/2003 | Eguchi | B60K 6/485 477/110 |
| 2011/0040432 | A1 | * | 2/2011 | Kaltenbach | B60K 6/365 701/22 |
| 2011/0320109 | A1 | * | 12/2011 | Polimeno | B60L 3/0092 701/113 |
| 2012/0065826 | A1 | * | 3/2012 | Kinoshita | B60K 6/445 701/22 |
| 2013/0066499 | A1 | * | 3/2013 | Niste | B60K 6/28 701/22 |
| 2013/0234446 | A1 | * | 9/2013 | Kishibata | G05B 19/00 290/38 R |
| 2013/0297187 | A1 | * | 11/2013 | Doering | F02D 41/022 701/104 |

FOREIGN PATENT DOCUMENTS

JP   A-2012-080706   4/2012

* cited by examiner

*Primary Examiner* — Arun Williams
(74) *Attorney, Agent, or Firm* — Oliff PLC

(57) ABSTRACT

A power supply system mounted in a vehicle. A rotary machine is connected to an output shaft of an internal-combustion engine of the vehicle, and has a power generation function, an engine start-up function, and an engine output assist function. A first secondary battery and a second secondary battery are each electrically connected in parallel with the rotary machine. A connection switch is provided along a connecting line electrically connecting the first and second secondary batteries, where the connection switch is configured to electrically connect and disconnect the second secondary battery and a parallel connection of the first secondary battery and the rotary machine. A switch controller is configured to disconnect the second secondary battery and the parallel connection by controlling the connection switch to a current cut-off state during the engine start-up and during engine output assist.

6 Claims, 3 Drawing Sheets

VEHICLE-MOUNTED POWER SUPPLY SYSTEM

CROSS-REFERENCE TO RELATED APPLICATION

This application is based on and claims the benefit of priority from earlier Japanese Patent Application No. 2013-52963 filed Mar. 15, 2013, the description of which is incorporated herein by reference.

BACKGROUND

1. Technical Field

The present invention relates to a vehicle-mounted power supply system including a first secondary battery, a second secondary battery, and a rotary machine having a power generation function for charging the first and second batteries.

2. Related Art

A known vehicle-mounted power supply system, as disclosed in Japanese Patent Application Laid-Open Publication No. 2012-80706, selectively uses a lead battery (as a first secondary battery) and a lithium-ion battery (as a second secondary battery) to supply power to various vehicle-mounted electrical loads. More specifically, the system electrically connects the lithium-ion battery to an alternator and the lead battery through a semiconductor switch.

During a regeneration period, placing the semiconductor switch in an on state allows for power supply from the alternator to the lithium-ion battery. During a non-regeneration period, placing the semiconductor switch in an off state allows for power supply from the lithium-ion battery to an electrical load disposed on the lithium-ion battery side of the semiconductor switch. Controlling the semiconductor switch in such a manner can lead to efficient use of the regenerated power.

In recent years, a rotary machine is available that includes a power generation function for generating electrical power by receiving a torque from an output shaft of an internal-combustion engine of the vehicle, a start-up function for starting the internal-combustion engine by applying an initial rotation to the output shaft of the internal-combustion engine of the vehicle, and an output assist function for assisting the output of the internal-combustion engine by applying a torque to the output shaft of the internal-combustion engine of the vehicle.

It can be considered that the rotary machine configured as above having the power generation function, the start-up function, and the output assist function is used in the vehicle-mounted power supply system in place of a conventional alternator. In such a configuration, the rotary machine is powered by the secondary batteries to drive the output shaft of the engine of the vehicle during the start-up and during the output assist. However, more power is consumed in the rotary machine than in the electrical loads (other than the rotary machine) connected to the secondary batteries. Accordingly, during the start-up and during the output assist, a higher current flows through the secondary batteries that supply power to the rotary machine, which may cause output voltage drops of the secondary batteries. The output voltage drops of the secondary batteries may lead to destabilized operations of the electrical loads (other than the rotary machine) powered by the secondary batteries.

In consideration of the foregoing, it would therefore be desirable to have a vehicle-mounted power supply system including a first secondary battery, a second secondary battery, and a connection switch for connecting and disconnecting the first and second secondary batteries, capable of advantageously executing power supply to an electrical load on the second secondary battery side of the connection switch connected between the first and second secondary batteries.

SUMMARY

In accordance with an exemplary embodiment of the present invention, there is provided a power supply system mounted in a vehicle. In the system, a rotary machine is connected to an output shaft of an internal-combustion engine of the vehicle, where the rotary machine has a power generation function for generating electrical power by receiving a torque from the output shaft of the engine, a start-up function for starting the engine by applying a torque to the output shaft of the engine, and an output assist function for assisting an output of the engine by applying a torque to the output shaft of the engine after start-up of the engine. A first secondary battery and a second secondary battery are each electrically connected in parallel with the rotary machine. A connection switch is provided along a connecting line electrically connecting the first and second secondary batteries, where the connection switch is configured to electrically connect and disconnect the second secondary battery and a parallel connection of the first secondary battery and the rotary machine. A switch controller is configured to disconnect the second secondary battery and the parallel connection of the first secondary battery and the rotary machine by controlling the connection switch to a current cut-off state during the rotary machine starting the engine and during the rotary machine assisting the output of the engine.

Placing the connection switch in the current cut-off state during the start-up and during output assist, where the rotary machine applies a torque to the crankshaft of the engine, can suppress fluctuations in voltage of the connecting line on the second secondary battery side of the connection switch even when an output voltage of the second secondary battery varies as a function of the torque applied from the rotary machine to the crankshaft of the engine. It should be noted that the vehicle is moving during the output assist. Hence, connecting the electrical load that requires operational stability, while the vehicle is moving, to the connecting line on the second secondary battery side of the connection switch allows the electrical load to be advantageously powered by the second secondary battery.

DESCRIPTION OF SPECIFIC EMBODIMENTS

The present inventions will be described more fully hereinafter with reference to the accompanying drawings. A power supply system in accordance with one embodiment of the present invention is a power supply system mounted in a vehicle, where the vehicle is driven by an internal-combustion engine as a drive source to travel.

The engine is provided with a starter. Upon start-up of the engine in response to a start-up command, the starter is mechanically engaged with a crankshaft (as an output shaft) of the engine by a gear mechanism, and externally applies a torque to the crankshaft of the engine, thereby starting the engine.

In place of a conventional alternator, a rotary machine having an engine start-up function and an output assist function, in addition to the power generation function for generating power when driven by the crankshaft of the engine, is connected to the crankshaft. To implement the engine start-up function, the rotary machine starts the engine by externally applying a torque to the crankshaft of the engine upon start-up of the engine during the engine combustion after warm-up of the engine. To implement the output assist function, the rotary machine assists in driving the crankshaft of the engine by externally applying a torque to the crankshaft of the engine during traveling of the vehicle.

The rotary machine may be a belt-driven integrated starter generator (ISG) connected to the crankshaft via a belt. The rotary machine is interposed between the crankshaft of the engine and a transmission and directly driven by the crankshaft to directly drive the crankshaft. Since the rotary machine is always connected to the crankshaft, the rotary machine can start the engine by applying a torque to the crankshaft even when the crankshaft is not completely stationary. Hence the rotary machine can advantageously start the engine upon idling stop and restart. In addition, adapting torque output characteristics of the starter to cold starting and adapting torque output characteristics of the rotary machine to start-up after warm-up can lead to advantageous execution of the engine start-up and the engine idling stop and restart in response to a start-up command.

Figure 1:
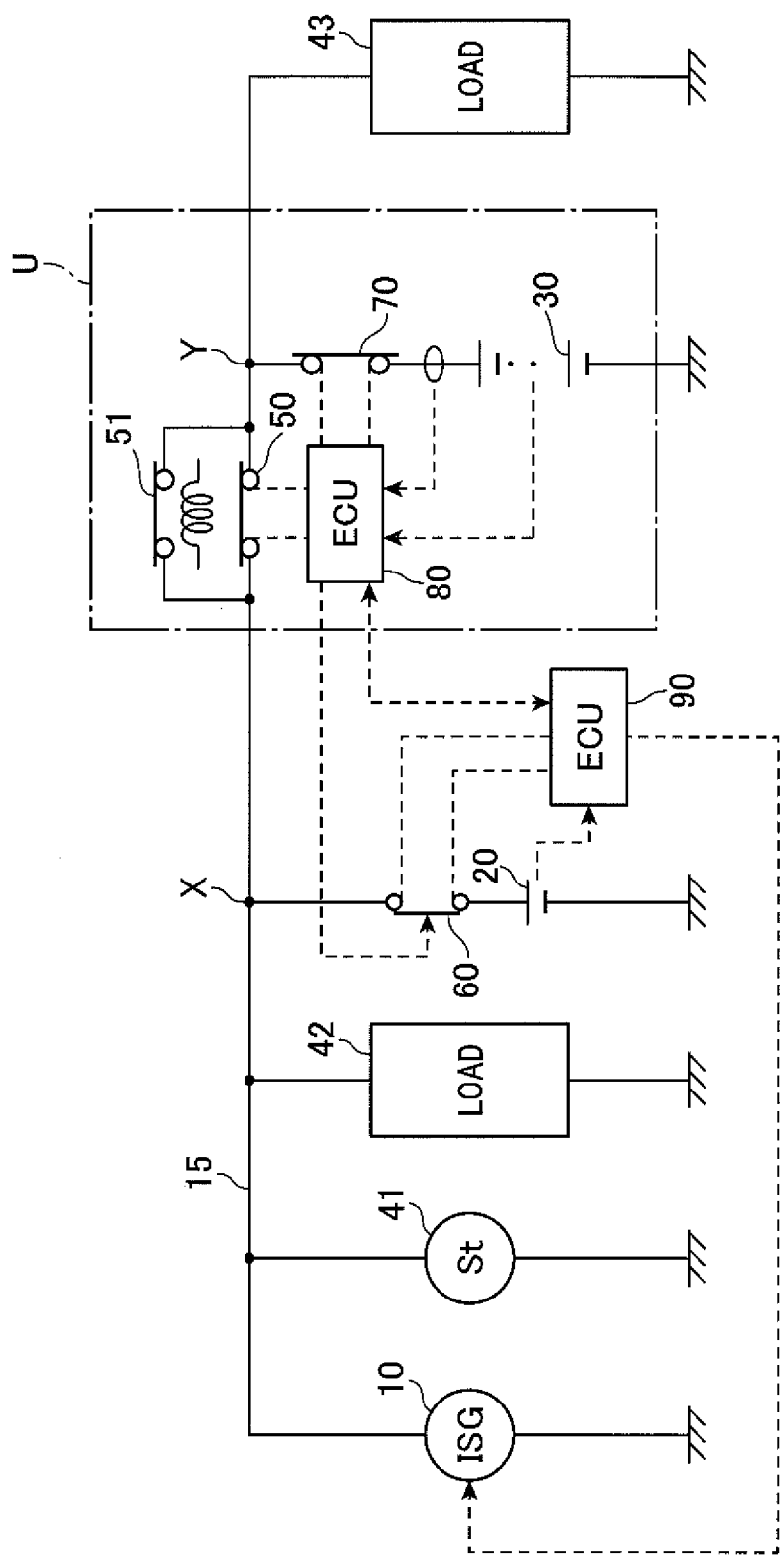
FIG. 1 schematically shows a vehicle-mounted power supply system in accordance with one embodiment of the present invention.

As shown in FIG. 1, the power supply system of the present embodiment includes the rotary machine 10, a lead battery 20 as a first secondary battery, a lithium-ion battery 30 as a second secondary battery, the starter 41, various electrical loads 42, 43, a metal-oxide semiconductor (MOS) switch 50 as a connection switch, a PB switch 60 as a first secondary battery switch, and an SMR switch 70 as a second secondary battery switch. The lead battery 20, the lithium-ion battery 30, the starter 41, the electrical loads 42, 43 are eclectically connected in parallel with the rotary machine 10 via a feeder 15 as a connection wire. The feeder 15 forms a feed path for interconnecting the above electrical elements.

The lead battery 20 is a well-known general-purpose secondary battery while the lithium-ion battery 30 is a high density secondary battery having a higher charging and discharging energy efficiency, a higher output density, and a higher energy density than the lead battery 20. The lithium-ion battery 30 is an assembled battery formed of a plurality of battery cells connected in series.

The MOS switch 50, a metal-oxide semiconductor field-effect transistor (MOSFET) based semiconductor switch, is connected between the lithium-ion battery 30 and a parallel connection of the rotary machine 10 and the lead battery 20. The MOS switch 50 functions as a switch that connects and disconnects the lithium-ion battery 30 and the parallel connection of the rotary machine 10 and the lead battery 20. The feeder 15 is provided with a bypass 51 connected in parallel with the MOS switch 50. The bypass 51, a normally closed electromagnetic relay, is placed in an off state when normally powered by the lead battery 20 or the lithium-ion battery 30. The bypass 51 is placed in an on state in the presence of an abnormality in the MOS switch 50 such that the MOS switch 50 is always in an off state, thereby bypassing the SMR switch 50.

The PB switch 60, a MOSFET based semiconductor switch similar to the MOS switch 50, is connected between the lead battery 20 and a first connection point X at which the rotary machine 10, the starter 41, the electrical load 42, and the MOS switch 50 are electrically connected to each other. The PB switch 60 functions as a switch that connects and disconnects the lead battery 20 and the first connection point X.

The SMR switch 70, a MOSFET based semiconductor switch similar to the MOS switch 50 and the PB switch 60, is connected between the lithium-ion battery 30 and a second connection point Y at which the MOS switch 50 and the electrical load 43 are electrically connected to each other. The SMR switch 70 functions as a switch that connects and disconnects the lithium-ion battery 30 and the second connection point Y.

The switching between an on state (current conduction state) and an off state (current cut-off state) of each of the MOS switch 50, the PB switch 60 and the SMR switch 70 is performed by the electronic control unit (ECU) 80 as a switch controller.

The lithium-ion battery 30, the switches 50, 70, and the ECU 80 are integrally accommodated in a casing to form a battery unit U. The ECU 80 is electrically connected to the ECU 90 outside the battery unit. That is, the ECUs 80, 90 are communicable with each other via a communication network, such as a Local Interconnect Network (LIN) or the like, so that the ECUs 80, 90 can share various data stored in each other.

The electrical load 43 is a constant-voltage requirement electrical load that requires supply power of a generally constant voltage or that voltage fluctuations of supply power are stably within a predetermined range. The electrical load 43 is electrically connected to the feeder 15 on the lithium-ion battery 30 side of the MOS switch 50. The lithium-ion battery 30 is therefore mainly responsible for power supply to the electrical load 43, that is, the constant-voltage requirement electrical load.

The electrical load 43 includes, but is not limited to, a vehicle navigation device or a vehicle audio device. For example, when a supply power voltage is not constant, but varies widely, or varies widely beyond the range above, the supply power voltage may instantaneously drop below a minimum operating voltage. This may cause failures to occur such that the operations of the constant-voltage requirement electrical load 43, e.g., the vehicle navigation device, can be reset during traveling of the vehicle. Supply power voltage to the electrical load 43 is therefore required to be kept constant and stable above the minimum operating voltage.

The electrical load 42 is a general electrical load other than the electrical load 43 (constant-voltage requirement electrical load) and the starter 41. The electrical load 42 includes, but is not limited to, headlights, a wiper such as a front windshield or the like, a blower fan of an air conditioner, a defrosting heater of a rear windshield or the like. The electrical load 42 also includes a drive load that drives when a predetermined drive condition is met. The drive load includes, for example, a power steering, a power window or the like. The starter 41 and the electrical load 42 are electrically connected to the feeder 15 on the lead battery 20 side of the MOS switch 50. The lead battery 20 is therefore mainly responsible for power supply to the starter 41 and the electrical load 42.

The rotary machine 10 receives rotation energy from the crankshaft of the engine to generate electrical power. Power generated in the rotary machine 10 is supplied to the electrical loads 42, 43 and further to the lead battery 20 and the lithium-ion battery 30. When the engine is stationary and no power is generated in the rotary machine 10, the rotary machine 10, the starter 41 and the electrical loads 42, 43 are powered by the lead battery 20 and the lithium-ion battery 30. An amount of discharge from each of the lead battery 20 and the lithium-ion battery 30 to the rotary machine 10, the starter 41 and the electrical loads 42-43, and an amount of charge from the rotary machine 10 to each of the lead battery 20 and the lithium-ion battery 30 are controlled so that a state of charge (SOC), an actual amount of charge divided by an amount of charge when fully charged, of each of the secondary batteries 20, 30 is within its proper SOC range such that of each of the lead battery 20 and the lithium-ion battery 30 is neither over charged nor over discharged.

The ECU 80 detects a temperature, an output voltage, and charge and discharge currents of the lithium-ion battery 30 to calculate an SOC of the lithium-ion battery 30 based on the detection values. The ECU 90 detects a temperature, an output voltage, and charge and discharge currents of the lead battery 20 to calculate an SOC of the lead battery 20 based on the detection values. The ECU 80 opens and closes each of the switches 50, 60, 70 based on its calculated SOC, thereby controlling the secondary batteries so that the SOCs of them are in their respective proper SOC ranges.

The rotary machine 10 is powered by the secondary batteries to drive the crankshaft of the engine. The rotary machine 10 is connected to the feeder 15 on the lead battery 20 side of the MOS switch 50. The lead battery 20 is thereby mainly responsible for power supply to the rotary machine 10.

In the present embodiment, the deceleration regeneration is executed such that the rotary machine 10 receives vehicle regenerative energy to generate electrical power and charges the generated power to the secondary batteries 20, 30 (mainly, the lithium-ion battery 30). The deceleration regeneration is executed under control of the ECU 90 on a condition that the vehicle is in a deceleration state and fuel injection to the vehicle engine is cut off. The secondary batteries 20, 30 are electrically connected in parallel with each other, so that when the switches 50, 60, 70 are all on, electrical power generated in the rotary machine 10 is preferentially charged to the secondary battery having a lower terminal voltage.

The terminal voltage of the lithium-ion battery 30 may be controlled to be more frequently lower than that of the lead battery 20 so that the lithium-ion battery 30 is preferentially charged over the lead battery 20. Such settings can be achieved by suitably setting open circuit voltages and internal resistance values of the secondary batteries 20, 30. The open circuit voltages can be adjusted by selecting a positive-electrode active material, a negative-electrode active material and an electrolyte of the lithium-ion battery 30.

In addition, in the present embodiment, the ECU 90 executes idling stop and restart such that the engine is automatically stopped when a predetermined automatic stop condition is met and the rotary machine 10 is controlled so as to automatically restart the engine when a predetermined restart condition is met while the engine is stationary after automatically stopped.

After the idling stop and restart as above is executed, launch assist (as output assist) is executed under control of the ECU 90 such that the rotary machine 10 applies a torque to the crankshaft of the engine until a vehicle speed reaches a predetermined speed. When the vehicle is accelerated by a driver of the vehicle depressing an accelerator pedal during traveling of the vehicle, interim assist (as output assist) is executed under control of the ECU 90 such that the rotary machine 10 applies a torque to the crankshaft of the engine. The interim assist is executed also when a higher output of the crankshaft is required, such as when the vehicle is traveling up a steep ascendant slope. The launch assist and the interim assist can enhance fuel efficiency of the vehicle.

A current flows through each secondary battery, of the secondary batteries 20, 30, that supplies power to the rotary machine 10, where the current varies as a function of the torque that the rotary machine 10 applies to the crankshaft of the engine during the start-up, during the launch assist, and during the interim assist. The output voltage of the secondary battery supplying power to the rotary machine 10 drops by a multiplication of the current and the internal resistance of the secondary battery. Such a output voltage drop of the secondary battery may cause a supply power voltage to the constant-voltage requirement electrical load 43 to drop transiently, which leads to unexpected reset of the operations of constant-voltage requirement electrical load 43.

In the present embodiment, therefore, the ECU 80 is configured to properly control the states of the respective switches 50, 60, 70 according to a traveling state of the vehicle, thereby suppressing failures such that the operations of the constant-voltage requirement electrical load 43 can be reset during traveling of the vehicle.

A MOS off state is a state of the switches 50, 60, 70 such that the MOS switch 50 is off and the PB switch 60 and the SMR switch 70 are both on. A PB off state is a state of the switches 50, 60, 70 such that the PB switch 60 is off and the MOS switch 50 and the SMR switch 70 are both on. An SMR off state is a state of the switches 50, 60, 70 such that the SMR switch 70 is off and the MOS switch 50 and the PM switch 60 are both on. In addition, a fully on state is a state of the switches 50, 60, 70 such that the MOS switch 50, the PB switch 60 and the SMR switch 70 are all on.

Figure 2:
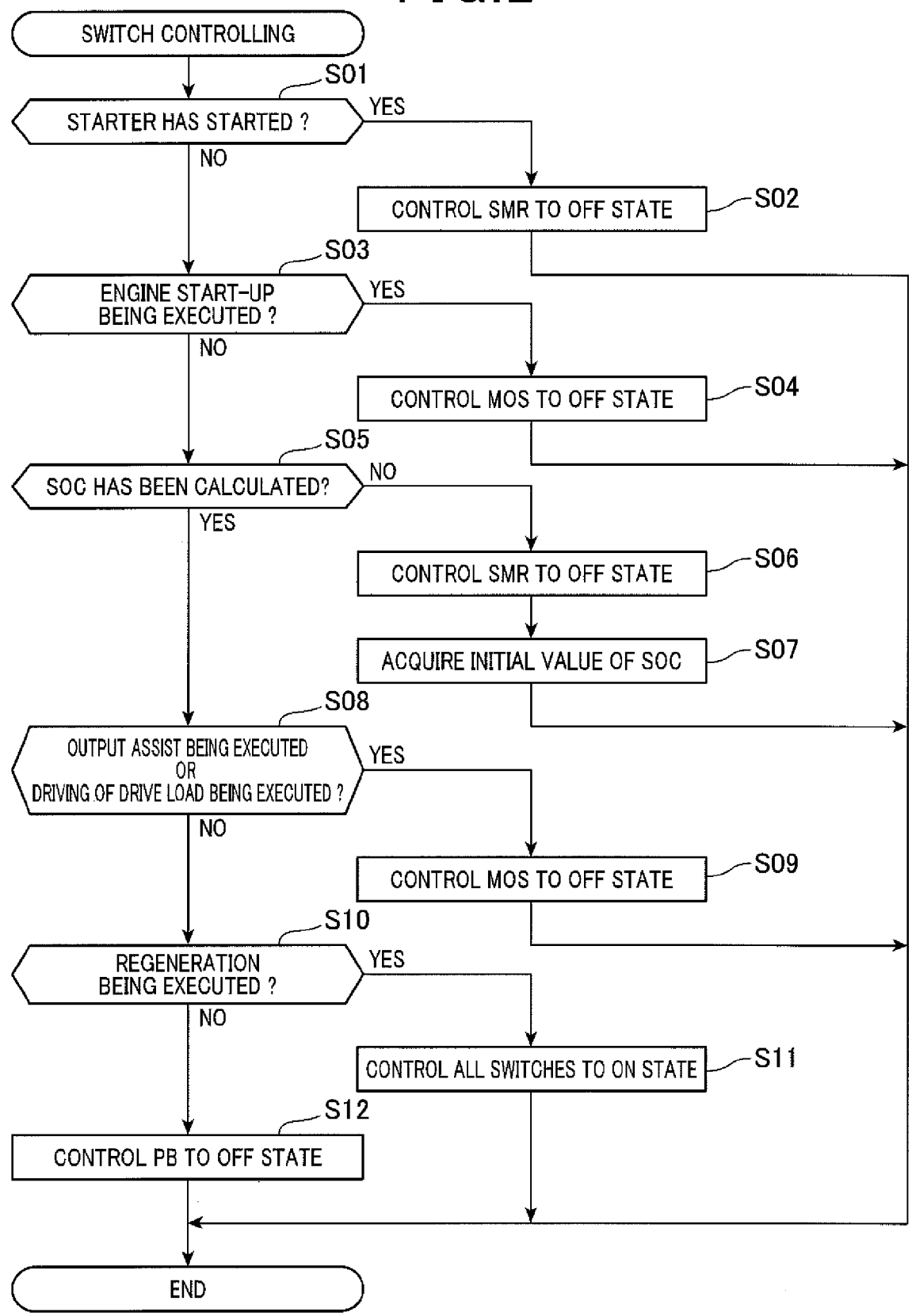
FIG. 2 schematically shows a flowchart of a switch control process.

A switch control process in accordance with the present embodiment will now be explained with reference to FIG. 2. This process is performed in the ECU 80 every predetermined time interval.

In step S01, it is determined whether or not the engine start-up is being executed by the starter 41. If it is determined in step S01 that the engine start-up is being executed by the starter 41, then in step S102 the switches 50, 60, 70 are controlled to the SMR off state.

If it is determined in step S01 that the engine start-up is not being executed by the starter 41, then in step S03 it is determined whether or not the engine start-up is being executed by the rotary machine 10. If it is determined in step S03 that the engine start-up is being executed by the rotary machine 10, then in step S104 the switches 50, 60, 70 are controlled to the MOS off state.

If it is determined in step S03 that the engine start-up is not being executed by the rotary machine 10, then in step S05 it is determined whether or not both of a state of charge (SOC) of the lead battery 20 and an SOC of the lithium-ion battery 30 have been calculated. If it is determined in step S05 that the SOCs of the lead battery 20 and the lithium-ion battery 30 have not both been calculated (i.e., neither or only one has been calculated), then in step S06 the switches 50, 60, 70 are controlled to the SMR off state.

Subsequently, in step S07, an initial value of SOC of the lead battery 20 or the lithium-ion battery 30 for which the SOC has not been calculated is obtained to enable the SOC calculation. Thereafter, the process is ended. The initial value of SOC for the lithium-ion battery 30 can be obtained by detecting an open circuit voltage thereof and then calculating the SOC based on a detection value of the open circuit voltage. The initial value of SOC for the lead battery 20 can be obtained by charging power at a predetermined voltage from the rotary machine 10 to the lead battery 20 and determining that the SOC of the lead battery 20 has reached a predetermined value of SOC (e.g., 90%) when a current flowing through the lead battery 20 has reduced to a predetermined value.

If it is determined in step S05 that both an SOC of the lead battery 20 and an SOC of the lithium-ion battery 30 have been calculated, then in step S08 it is determined whether or not the output assist or driving of the drive load included in the electrical load 42 is being executed by the rotary machine 10. If it is determined in step S08 that the output assist or driving of the drive load is being executed by the rotary machine 10, then in step S09 the switches 50, 60, 70 are controlled to the MOS off state. That is, the switches 50, 60, 70 are set to the MOS off state when the output assist or driving of the drive load is being executed, which can suppress fluctuations of voltage of the feeder 15 on the lithium-ion battery 30 side of the MOS switch 50.

If it is determined in step S08 that neither the output assist nor the driving of the drive load is being executed by the rotary machine 10, then in step S10 it is determined whether or not the regeneration is being executed in the rotary machine 10. If it is determined in step S10 that the regeneration is being executed in the rotary machine 10, then in step S11 the switches 50, 60, 70 are controlled to the fully on state, where the lead battery 20 and the lithium-ion battery 30 are charged.

If it is determined in step S10 that the regeneration is not being executed in the rotary machine 10, then in step S11 the switches 50, 60, 70 are controlled to the PB off state. This is because it can be assumed that idling is stopped or the vehicle is traveling.

Figure 3:
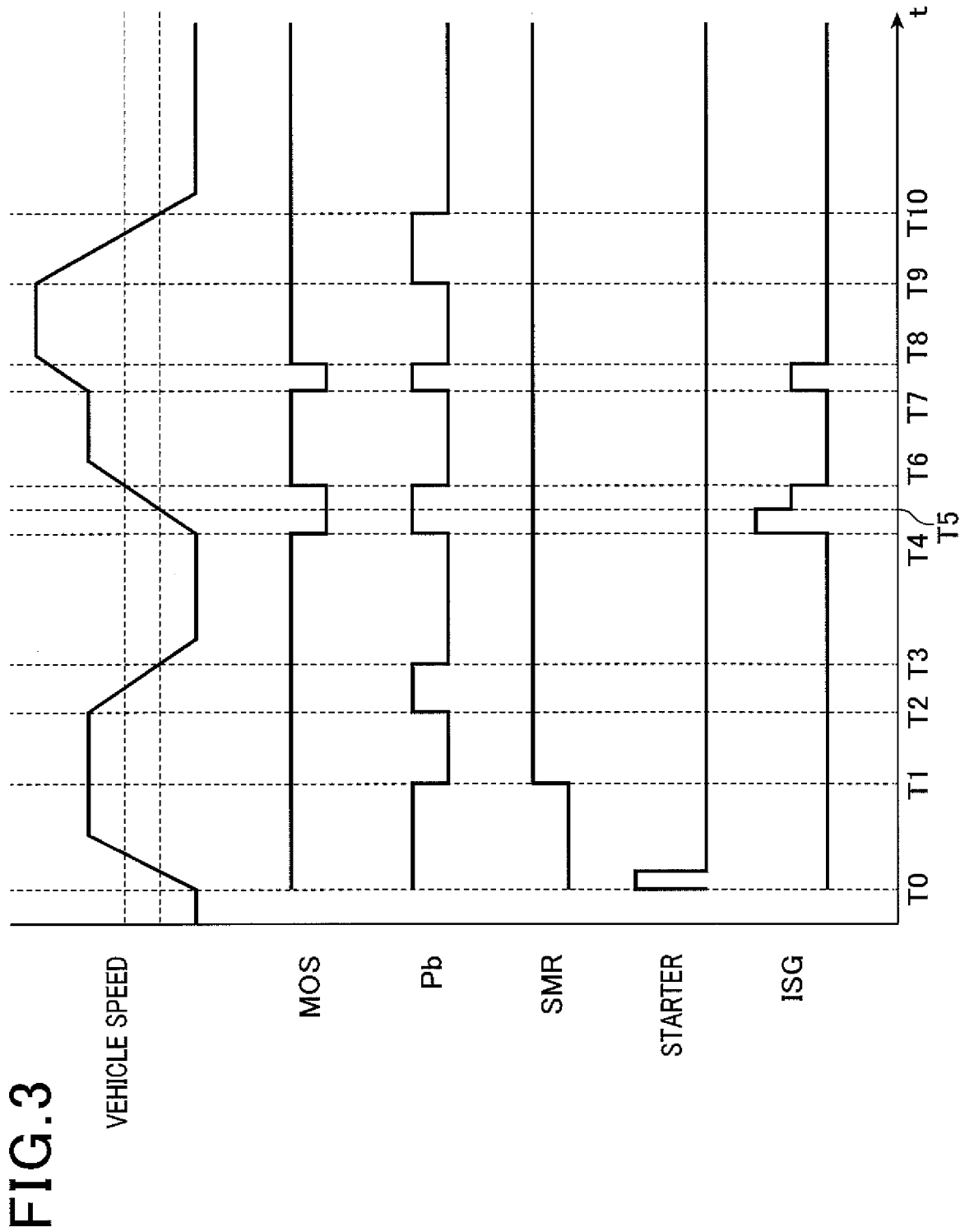
FIG. 3 schematically shows a timing diagram of an example of switch control.

FIG. 3 shows a timing diagram for the switch control.

At time t0, initial start-up is executed in response to a start-up command. During the initial start-up, the starter 41 applies a torque to the crankshaft of the engine. After power supply to the ECUs 80, 90 is initiated, the ECUs 80, 90 begin various processes. The ECU 80 controls the switches 50, 60, 70 to the SMR off state. The switches 50, 60, 70 are set to the SMR off state during the start-up executed by the starter 41, which allows the starter 41 and the electrical loads 42, 43 to be powered by the lead battery 20 and inhibits discharging of the lithium-ion battery 30. During the initial start-up, the SOC of the lithium-ion battery 30 is unknown. Hence inhibiting the discharging of the lithium-ion battery 30 with its SOC being unknown can prevent over-discharge of the lithium-ion battery 30.

After the initial start-up of the engine, the vehicle travels normally. Since initial values of the SOC of the lead battery 20 and the SOC of the lithium-ion battery 30 are unknown immediately after the initial start-up of the engine, the switches 50, 60, 70 are kept in the SMR off state.

Since the SMR switch 70 is off, an output voltage of the lithium-ion battery 30 is equal to its open circuit voltage. Hence the ECU 80 acquires the output voltage of the lithium-ion battery 30 as the open circuit voltage and then acquires the initial value of the SOC of the lithium-ion battery 30 based on the acquired open circuit voltage with use of a map defining relationships between open circuit voltages and SOCs of the lithium-ion battery 30.

Since the PB switch 60 is on in the SMR off state, the rotary machine 10 and the lead battery 20 are electrically connected to each other. The rotary machine 10 is driven by the crankshaft of the engine to generate electrical power and charges the generated power at a predetermined voltage to the lead battery 20, thereby acquiring the initial value of the SOC of the lead battery 20.

After the initial values of the SOC of the lead battery 20 and the SOC of the lithium-ion battery 30 are acquired at time T1, the ECU 80 controls the switches 50, 60, 70 to the PB off state. During a time period of time T1 through T2, the vehicle travels normally and the PB switch 60 is off in the PB off state, which inhibits power supply from the lead battery 20 to the electrical loads 42, 43. The MOS switch 50 and the SMR switch 70 are on in the PB off state, which allows the electrical loads 42, 43 to be powered by the lithium-ion battery 30.

At time T2, a brake pedal is depressed by a driver of the vehicle. A vehicle speed is thereby decelerated and then an execution condition for regeneration is met, thereby initiating the regeneration. Upon initiation of the regeneration, the ECU 80 controls the switches 50, 60, 70 to the fully on state. The PB switch 60 is set on, which allows the rotary machine 10 and the lead battery 20 to be electrically connected to each other. The MOS switch 50 and the SMR switch 70 are also on, which allows the rotary machine 10 and the lithium-ion battery 30 to be electrically connected to each other. Hence, during a time period of time T2 through T3, electrical power is generated via the regeneration in the rotary machine 10, thereby charging the lead battery 20 and the lithium-ion battery 30.

At time T3, the vehicle speed is decreased below a predetermined speed (e.g., 10 km/h) and then an automatic stop condition is met, thereby executing idling stop. Upon execution of the idling stop, the ECU 80 controls the switches 50, 60, 70 to the PB off state. During a time period of time T3 through T4 in which the idling stop is executed, the switches 50, 60, 70 are set to the PB off state, which allows the electrical loads 42, 43 to be powered solely by the lithium-ion battery 30.

At time T4, an accelerator pedal is depressed by a driver of the vehicle. A restart condition thereby is met. The ECU 90 then drives the rotary machine 10 to apply a torque to the crankshaft of the engine, thereby restarting the engine automatically. Upon restart after idling stop, the ECU 80 controls the switches 50, 60, 70 to the MOS off state. Hence, during a time period of time T4 through T5 where the engine restart after idling stop is executed, the rotary machine 10 and the electrical load 42 are powered by the lead battery 20 and the constant-voltage requirement electrical load 43 is powered by the lithium-ion battery 30.

At time T5, the engine enters a state of stable ignition, where a rotation speed of the crankshaft of the engine becomes equal to or greater than a predetermined value. The ECU 90 allows the rotary machine 10 to continue to apply a torque to the crankshaft of the engine, thereby executing launch assist with use of the rotary machine 10. Meanwhile the ECU 80 leaves the switches 50, 60, 70 in the MOS off state. Hence, during a time period of time T5 through T6 where the launch assist is executed by the rotary machine 10, the rotary machine 10 and the electrical load 42 are powered by the lead battery 20 and the constant-voltage requirement electrical load 43 is powered by the lithium-ion battery 30.

A torque required to be externally applied to the crankshaft of the engine during the launch assist is less than during the start-up of the engine. Hence, the torque applied from the rotary machine 10 to the crankshaft of the engine during a time period of time T5 through T6 where the launch assist is executed is less than the torque applied from the rotary machine 10 to the crankshaft during the time period of time T4 through T5 where the engine restart after idling stop is executed.

At time T6, the vehicle speed exceeds a predetermined speed (e.g., 30 km/h). The ECU 90 then causes the rotary machine 10 to terminate the launch assist. Upon termination of the launch assist, the ECU 80 controls the switches 50, 60, 70 to the PB off state.

At time T7, an accelerator pedal is strongly depressed by the driver of the vehicle. An execution condition for an interim assist is thereby met. Then, the ECU 90 executes the interim assist by driving the rotary machine 10 to apply a torque to the crankshaft of the engine. Upon execution of the interim assist, the ECU 80 controls the switches 50, 60, 70 to the MOS off state. Hence, during a time period of time T7 through T8 where the interim assist is executed, the rotary machine 10 and the electrical load 42 are powered by the lead battery 20 and the constant-voltage requirement electrical load 43 is powered by the lithium-ion battery 30.

The torque applied from the rotary machine 10 to the crankshaft of the engine during the interim assist varies with a depression amount of the accelerator pedal or the like. In addition, as with the launch assist, the torque required to be externally applied to the crankshaft of the engine during the interim assist is less than during the start-up of the engine. Hence, the torque applied from the rotary machine 10 to the crankshaft of the engine during a time period of time T7 through T8 where the interim assist is executed is less than the torque applied from the rotary machine 10 to the crankshaft of the engine during the time period of time T4 through T5 where the engine restart after idling stop is executed.

At time T8, the depression amount of the accelerator pedal is decreased, which causes the execution condition for the interim assist to be unmet. Then the ECU 90 terminates the interim assist. Upon termination of the interim assist, the ECU 80 controls the switches 50, 60, 70 to the PB off state.

At time T9, an execution condition for the deceleration regeneration is met. Then the ECU 90 controls the rotary machine 10 to execute the regeneration. Upon execution of the regeneration, the ECU 80 controls the switches 50, 60, 70 to the fully on state. At time T10, the automatic stop condition is met and then the ECU 90 executes the idling stop. Upon execution of the idling stop, the ECU 80 controls the switches 50, 60, 70 to the PB off state.

The present embodiment can provide the following benefits.

The ECU 80 controls the MOS switch 50 to its off state during the start-up of the engine, during the interim assist, and during the launch assist, where the rotary machine 10 applies the torque to the crankshaft of the engine. This can suppress variations in voltage of the feeder 15 on the lithium-ion battery 30 side of the MOS switch 50 that would be caused by variations in output voltage of the secondary battery as a function of the torque applied from the rotary machine 10 to the crankshaft of the engine. It should be noted that the vehicle is moving during the interim assist and during the launch assist. Hence, connecting the electrical load 43 that requires operational stability while the vehicle is moving to the feeder 15 on the lithium-ion battery 30 side of the MOS switch 50 allows the electrical load 43 to be advantageously powered by the lithium-ion battery 30.

It is disadvantageous that, for example, when the constant-voltage requirement electrical load 43, such as a vehicle navigation device, is reset during traveling of the vehicle, a destination has to be set again. In the present embodiment, the effect of voltage drops on the feeder 15 on the lithium-ion battery 30 side of the MOS switch 50 can be suppressed by controlling the MOS switch 50. Hence, connecting the constant-voltage requirement electrical load 43 to the feeder 15 on the lithium-ion battery 30 side of the MOS switch 50 allows the electrical load 43 to be driven properly.

The MOS switch 50 and the PB switch 60 are controlled to off and on states, respectively, during the start-up of the engine, during the interim assist, and during the launch assist, where the rotary machine 10 applies the torque to the crankshaft of the engine. This can suppress variations in voltage of the feeder 15 on the lithium-ion battery 30 side of the MOS switch 50 that would be caused by variations in output voltage of the secondary battery as a function of the torque applied from the rotary machine 10 to the crankshaft of the engine. It should be noted that the vehicle is moving during the output assist. Hence, connecting the electrical load that requires operational stability while the vehicle is moving to the feeder 15 on the lithium-ion battery 30 side of the MOS switch 50 allows the electrical load to be advantageously powered by the lithium-ion battery 30.

Meanwhile, when the MOS switch 50 and the PB switch 60 are set on and off, respectively, the electrical load 42 electrically connected to the first connection point X can be driven by the supply power from the lithium-ion battery 30 without consuming power of the lead battery 20. In this setting, the SOC of the lead battery 20 can be reserved in anticipation of power requirement for driving the rotary machine 10 during the start-up or during the output assist, thereby providing user-intended driving and traveling of the vehicle.

During power generation in the rotary machine 10, the MOS switch 50, the PB switch 60, the SMR switch 70 are all set on even when the rotary machine 10 is not applying the torque to the crankshaft of the engine. This leads to the fully on state where the lead battery 20, the lithium-ion battery 30, and the rotary machine 10 are electrically connected to each other, which allows the power generated in the rotary machine 10 to be charged to both of the lead battery 20 and the lithium-ion battery 30.

An amount of free capacity of the lithium-ion battery 30 can be increased by the electrical loads 42, 43 being solely powered by the lithium-ion battery 30 during a non-driving state of the rotary machine 10. This allows more power generated in the rotary machine 10 during the regeneration to be charged to the lithium-ion battery 30. Since the lithium-ion battery 30 has higher energy efficiency than the lead battery 20, increasing an amount of charge or discharge of the lithium-ion battery 30 can provide higher energy efficiency of the whole power supply system.

When the lithium-ion battery 30 is over charged, it may expand. When the lithium-ion battery 30 is over discharged, it may significantly degrade. Therefore, charging and discharging management has to be done properly for the lithium-ion battery 30 on the basis of the SOC thereof. In the present embodiment, an initial value of the SOC of the lithium-ion battery 30 is acquired and the lithium-ion battery 30 is inhibited from being charged and discharged by placing the SMR switch 70 in the off state until the SOC of the lithium-ion battery 30 is calculated. In addition, placing each of the MOS switch 50 and the PB switch 60 in the on state allows the electrical loads 42, 43 to be powered by the lead battery 20. This can prevent the lithium-ion battery 30 from being over charged and over discharged while driving the electrical loads 42, 43.

MODIFICATIONS

The embodiment set forth above may be modified as follows.

In the embodiment set forth above, the rotary machine 10 is solely powered by the lead battery 20 during the output assist. Charged power of the lead battery 20 may decrease below power requirement for restarting the engine after idling stop due to power consumption during the output assist. In some alternative embodiments, therefore, the switches 50, 60, 70 may be controlled to the fully on state on a condition that a torque applied from the rotary machine 10 to the crankshaft of the engine is less than a predetermined value.

This allows the SOC of the lead battery 20 to be kept at a high level and further allows the rotary machine 10 to be solely powered by the lead battery 20 during the engine restart after idling stop. Further, during the output assist of the rotary machine 10, the switches 50, 60, 70 may be controlled to the fully on state on a condition that the torque applied from the rotary machine 10 to the crankshaft of the engine is less than the predetermined value and the SOC of the lead battery 20 is below a predetermined value.

In some alternative embodiments to the embodiment set forth above, the PB switch 60 and the SMR switch 70 may be removed and only the MOS switch 50 may be connected between the lead battery 20 and the lithium-ion battery 30. Also in such a configuration, the ECU 80 can prevent the operation of the constant-voltage requirement electrical load 43 from being destabilized by placing the MOS switch 70 in the off state during driving of the rotary machine 10.

In some alternative embodiments to the embodiment set forth above, the starter 41 may be removed. Initial start-up of the engine may be executed by the rotary machine 10 applying an initial torque to the crankshaft of the engine.

In some alternative embodiments to the embodiment set forth above, general electrical loads in place of or in addition to the constant-voltage requirement electrical load 43 may be electrically connected to the feeder 15 on the lithium-ion battery 30 side of the MOS switch 50. Fluctuations of voltage of the feeder 15 on the lithium-ion battery 30 side of the MOS switch 50 are more suppressed than on the lead battery 20 side of the MOS switch 50. For example, when vehicle headlights, as general electrical loads, are electrically connected to the feeder 15 on the lithium-ion battery 30 side of the MOS switch 50, fluctuations of brightness of the headlights can be suppressed.

In the embodiment set forth above, the system is configured to include the lead battery 20 as a first secondary battery and the lithium-ion battery 30 as second secondary battery. Alternatively, other types of secondary batteries may be included as the first and second secondary batteries. For example, a nickel-hydrogen battery may be included as a first secondary battery, and a nickel-cadmium battery may be included as a second secondary battery. Still alternatively, the same type of batteries may be included as the first and second batteries.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A power supply system mounted in a vehicle, comprising:
   a rotary machine connected to an output shaft of an internal-combustion engine of the vehicle, the rotary machine having a power generation function for generating electrical power by receiving a torque from the output shaft of the engine, a start-up function for starting the engine by applying a torque to the output shaft of the engine, and an output assist function for assisting an output of the engine by applying a torque to the output shaft of the engine after start-up of the engine;
   a first secondary battery and a second secondary battery each electrically connected in parallel with the rotary machine;
   a connection switch provided along a connecting line electrically connecting the first and second secondary batteries, the connection switch being configured to electrically connect and disconnect the second secondary battery and a parallel connection of the first secondary battery and the rotary machine; and
   a switch controller configured to disconnect the second secondary battery and the parallel connection of the first secondary battery and the rotary machine by controlling the connection switch to a current cut-off state during the rotary machine starting the engine and during the rotary machine assisting the output of the engine.

2. The system of claim 1, wherein a constant-voltage requirement electrical load that requires a predetermined constant voltage supplied thereto is electrically connected to the connecting line on the second secondary battery side of the connection switch.

3. The system of claim 1, further comprising a first battery switch connected between the first secondary battery and a first connection point that is disposed along the connecting line and between the first secondary battery and the connection switch and is electrically connected to the rotary machine, the first battery switch being configured to electrically connect and disconnect the first secondary battery and the first connection point, wherein the switch controller is configured to, during the rotary machine applying a torque to the output shaft of the engine, control the connection switch to a current cut-off state and the first secondary battery to a current conduction state, and during the rotary machine applying no torque to the output shaft of the engine, control the connection switch to a current conduction state and the first secondary battery to a current cut-off state.

4. The system of claim 3, wherein the switch controller is configured to, during the rotary machine receiving a torque from the output shaft of the engine to generate electrical power, control the connection switch to a current conduction state and the first secondary battery to a current conduction state.

5. The system of claim 3, wherein the second secondary battery has a higher charge-discharge energy efficiency than the first secondary battery.

6. The system of claim 3, wherein
   the first secondary battery is a lead battery,
   the second secondary battery is a lithium-ion battery, and
   the system further comprising:
   a second battery switch connected between the second secondary battery and a second connection point that is disposed along the connecting line and between the second secondary battery and the connection switch and is electrically connected to an electrical load, the second battery switch being configured to electrically connect and disconnect the second secondary battery and the second connection point; and
   a state-of-charge (SOC) calculator configured to calculate a state-of-charge of the second secondary battery,
   wherein the switch controller is configured to, regardless of whether or not the rotary machine is applying a torque to the output shaft of the engine, unless the SOC of the second secondary battery has been calculated by the SOC calculator, control the connection switch to a current conduction state, the first secondary battery to a current conduction state, and the second secondary battery to a current conduction state.

* * * * *